May 15, 1951 G. E. DATH 2,552,668
FRICTION SHOCK ABSORBER FOR RAILWAY CAR TRUCKS
Filed July 16, 1949

Inventor:
George E. Dath.
By Henry Fuchs.
Atty.

Patented May 15, 1951

2,552,668

UNITED STATES PATENT OFFICE 2,552,668

FRICTION SHOCK ABSORBER FOR RAILWAY CAR TRUCKS

George E. Dath, Mokena, Ill., assignor to W. H. Miner, Inc., Chicago, Ill., a corporation of Delaware Application July 16, 1949, Serial No. 105,197

3 Claims. (Cl. 267—9)

This invention relates to improvements in friction shock absorbers for snubbing or dampening the action of railway car truck springs.

One object of the invention is to provide a friction shock absorber for dampening or snubbing the action of truck springs of railway cars, including a friction casing, a friction clutch telescoped within the casing, and a rubber cushioning element within the casing opposing inward movement of the clutch, wherein the clutch is moved inwardly of the casing by a pressure transmitting means, comprising a follower and rubber plug, reacting between the latter and the clutch, the follower having a projection thereon within which the rubber plug is housed, the projection having openings through which the rubber of the plug is squeezed in compression of the mechanism to provide cushioning means interposed between the follower and the end of the casing, adapted to be compressed, during the last part of the compression stroke of the mechanism, to cushion the heavy final shocks to which said mechanism is subjected and provide ultimate high shock absorbing capacity.

Other objects of the invention will more clearly appear from the description and claims hereinafter following.

Figure 1:
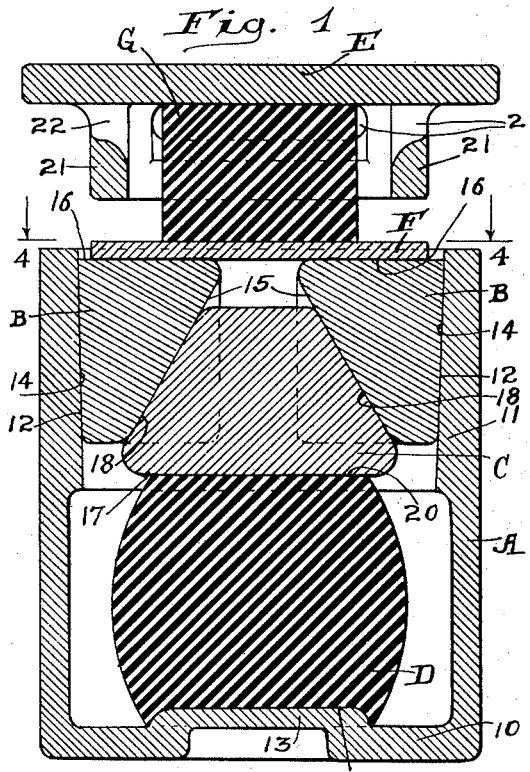
Figure 2:
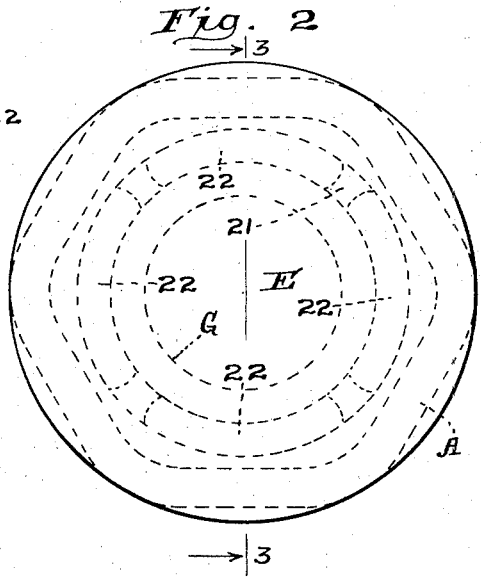
Figure 3:
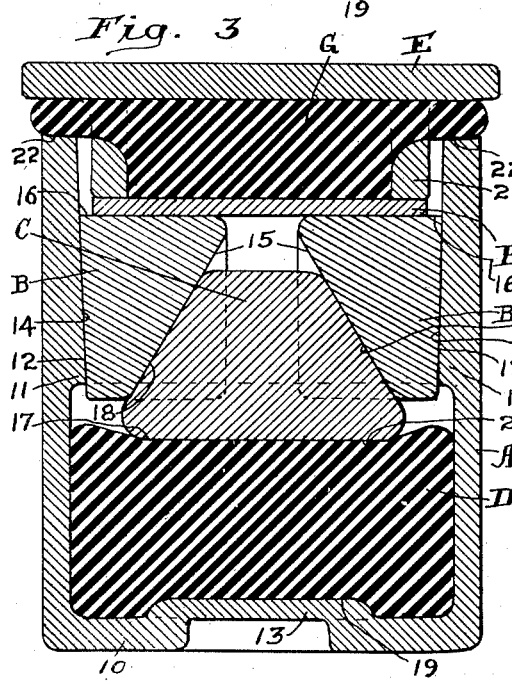
Figure 4:
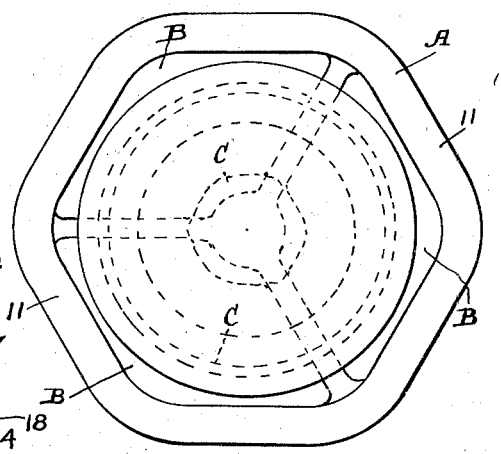

In the accompanying drawing forming a part of this specification, Figure 1 is a vertical sectional view of my improved shock absorber. Figure 2 is a top plan view of Figure 1. Figure 3 is a view similar to Figure 1, showing the mechanism compressed. Figure 4 is a horizontal sectional view, corresponding substantially to the line 4—4 of Figure 1.

As shown in the drawing, my improved shock absorber comprises broadly a friction casing A, three friction shoes B—B—B, a combined follower and wedge C, a rubber cushioning element D within the casing, yieldingly opposing inward movement of the combined follower and wedge C, a pressure transmitting follower member E, a follower plate F, and a rubber plug G between the follower member E and the follower plate F.

The friction casing A is in the form of a tubular member of substantially hexagonal, transverse cross section. The casing is open at its upper end and has a transverse bottom wall 10 at its lower end. At the open upper end, the walls of the casing are inwardly thickened to provide a friction shell section 11. The friction shell section 11 presents three longitudinally extending, interior friction surfaces 12—12—12 of V-shaped, transverse cross section. The surfaces 12—12—12 preferably converge inwardly of the casing. The bottom wall 10 is inwardly offset at the center to provide an inwardly projecting boss 13.

The shoes B—B—B are of similar design, each shoe having a lengthwise extending friction surface 14 on its outer side of V-shaped, transverse cross section, engaged with the corresponding interior friction surface 12 of the casing, a wedge face 15 of V-shaped, transverse section on its inner side, and a transverse, flat end face 16 at its upper end. The three shoes B—B—B are arranged symmetrically about the central longitudinal axis of the casing A and the wedge faces 15—15—15 of said shoes diverge inwardly of the casing.

The combined follower and wedge C is in the form of a block having a flat, transverse, bottom end face 17, and three forwardly converging wedge faces 18—18—18 of V-shaped, transverse cross section, correspondingly inclined to and engaged with the wedge faces 15—15—15 of the shoes B—B—B. The shoes B—B—B, together with the wedge C, form a friction clutch, which is slidingly telescoped within the casing A.

The rubber cushioning element D is in the form of a block of circular, transverse cross section, bulged outwardly between its ends, as shown in Figure 1. The element D has its bottom end inset, as indicated at 19, to fit over the boss 13 of the casing A. At the upper end, the element D presents a substantially flat, transverse face 20, bearing on the flat bottom end face 17 of the combined wedge and follower C.

The pressure transmitting follower member E comprises a platelike member of hexagonal outline, having a depending, tubular flange 21 thereon of substantially circular shape, inset from the outer edge of said follower and of a size to pass freely into the open top end of the casing A. The portion of the platelike section of the follower, which extends laterally outwardly beyond the tubular flange 21, overhangs the outer walls of the casing A, as clearly shown in Figure 1. The flange 21 is provided with a plurality of transverse openings 22, preferably four. The openings 22 flare inwardly, as clearly shown in Figure 1.

The follower plate F is in the form of a circular disc, resting on top of the shoes B—B—B.

The rubber plug G is in the form of a cylindrical block, surrounded by the tubular flange 21 of the follower member E and is supported on the follower plate F, with its upper end abutting the underneath side of the platelike portion of the pressure transmitting follower member E. The rubber plug G thus supports the follower member E on the shoes B—B—B. The plug G is of such a size as to provide considerable clearance between the same and the side walls of the tubular flange 21, and projects downwardly below the lower end of said flange, thereby, in the normal full expanded condition of the shock absorber, holding the flange spaced from the follower plate F.

My improved shock absorber replaces one or more of the spring units of a truck spring cluster of a railway car, being interposed between the top and bottom spring plates of said cluster.

The operation of my improved shock absorber is as follows: Upon the spring cluster of the truck of a railway car being compressed between the spring follower plates of the cluster, the pressure transmitting follower member E is forced downwardly with respect to the casing A, forcing the rubber plug G downwardly against the follower plate F, thereby displacing the clutch, comprising the shoes B—B—B and the combined wedge and follower C inwardly of the casing, against the resistance of the rubber cushioning element D. Due to the wedging action produced between the shoes B—B—B and the combined follower and wedge C, the shoes are spread apart into tight frictional engagement with the friction surfaces of the casing during inward sliding movement of the shoes with respect to said casing. As the mechanism is being compressed, both the rubber cushioning element D and the plug G will be compressed lengthwise. However, the combined shock absorbing capacity of the friction clutch and rubber element being considerably greater than that of the rubber plug G, the latter is compressed to such an extent that the flange 21 of the follower member E comes into engagement with the follower plate F to transmit the pressure directly to the clutch prior to full compression of the device. During compression of the plug G to the extent just described, portions of the plug are squeezed out through the openings 22 of the flange 21 of the follower member E into underlying relation with respect to the projecting platelike portion of said follower to be subjected to compression between the latter and the upper end of the casing during the last part of the compression stroke of the mechanism, as illustrated in Figure 3. By interposition of the projected portion of the rubber plug G, there is no so-called solid point in the compression of the device, that is, at no time does the follower member E go solid against the casing A to provide, together with the casing, in effect, a solid column pressure transmitting means.

As will be evident, my improved construction provides exceedingly high shock absorbing capacity as the compression of the mechanism approaches the ultimate fully compressed state, due to the interposition of the rubber shock absorbing material between the follower member E and the upper end of the casing A.

During recoil of the truck springs, the pressure on the follower member E is reduced and the parts are returned to the normal position shown in Figure 1, by the rubber element D and the rubber plug G returning to their original shape, that is, expanding lengthwise.

I claim:

1. In a friction shock absorber, the combination with a friction casing open at one end; of a friction clutch slidingly telescoped within the open end of said casing; a rubber element within the casing, yieldingly resisting inward movement of the clutch; a follower movable toward and away from the open end of the casing; a rubber plug interposed between said follower and clutch for transmitting pressure from said follower to the clutch; and a flange projecting from said follower and surrounding said plug, said plug normally projecting inwardly beyond the inner end of said flange, said flange having openings therethrough through which the rubber of said plug flows during compression of the same to project portions of said rubber into underlying relation with respect to said follower between the latter and the ends of the side walls of said casing at said open end.

2. In a friction shock absorber, the combination with a friction casing open at one end; of a friction clutch slidingly telescoped within the open end of said casing; a rubber element within the casing, yieldingly opposing inward movement of the clutch; a follower movable toward and away from the open end of the casing; a projecting tubular flange on said follower engageable with the clutch after a predetermined amount of compression of the mechanism, less than the full compression stroke of the same, to actuate the clutch; a rubber plug enclosed within said tubular flange and protruding outwardly beyond the same into engagement with said clutch, said plug bearing on said follower, said tubular flange having openings therethrough through which portions of said plug are flowable during compression of the plug to project said portions thereof into underlying relation with respect to said follower between the same and the end of the casing.

3. In a friction shock absorber, the combination with a friction casing open at one end; of a yieldingly resisted friction clutch slidingly telescoped within said open end of the casing; a follower movable toward and away from the open end of the casing; a hollow projection on said follower extending toward said casing, said follower extending laterally outwardly beyond said projection into opposed relation with the ends of the walls of said casing at said open end thereof; a rubber plug enclosed within said hollow projection and protruding beyond the outer end of the same into pressure transmitting relation with respect to said clutch, said plug being compressible between said follower and clutch, and said projection being brought into active relation with respect to said clutch upon said plug being compressed flush with the outer end of said projection, said projection having openings therethrough, through which portions of said plug are flowable during compression of the same to project said portions of said plug into underlying relation with respect to said laterally outwardly extended portions of said follower.

GEORGE E. DATH.

REFERENCES CITED

The following references are of record in the file of this patent:

UNITED STATES PATENTS

| Number | Name | Date |
|---|---|---|
| 1,542,828 | O'Connor | June 23, 1925 |
| 1,862,764 | O'Connor | June 14, 1932 |
| 2,254,781 | Rabbitt | Sept. 2, 1941 |
| 2,352,030 | Sproul | June 20, 1944 |
| 2,402,146 | Cardwell | June 18, 1946 |
| 2,410,933 | Freeman | Nov. 12, 1946 |